United States Patent
Middlemiss

(10) Patent No.: US 6,915,866 B2
(45) Date of Patent: Jul. 12, 2005

(54) POLYCRYSTALLINE DIAMOND WITH IMPROVED ABRASION RESISTANCE

(75) Inventor: Stewart Middlemiss, Salt Lake City, UT (US)

(73) Assignee: Smith International, Inc., Houston, TX (US)

(*) Notice: Subject to any disclaimer, the term of this patent is extended or adjusted under 35 U.S.C. 154(b) by 18 days.

(21) Appl. No.: 10/349,212

(22) Filed: Jan. 21, 2003

(65) Prior Publication Data

US 2004/0140132 A1 Jul. 22, 2004

(51) Int. Cl.⁷ .................................... E21B 10/26
(52) U.S. Cl. ........................... 175/374; 175/434
(58) Field of Search .................. 175/374, 434, 175/426

(56) References Cited

U.S. PATENT DOCUMENTS

| | | | |
|---|---|---|---|
| 5,755,299 A | 5/1998 | Langford, Jr. et al. | |
| 6,102,140 A | * 8/2000 | Boyce et al. | 175/374 |
| 6,564,884 B2 | * 5/2003 | Bird | 175/57 |
| 6,651,757 B2 | * 11/2003 | Belnap et al. | 175/374 |
| 2002/0017402 A1 | * 2/2002 | Bird | 175/426 |
| 2002/0043407 A1 | * 4/2002 | Belnap et al. | 175/374 |

FOREIGN PATENT DOCUMENTS

| | | |
|---|---|---|
| JP | 61111965 A | 5/1986 |
| WO | WO 98/46384 | 10/1998 |

OTHER PUBLICATIONS

International Search Report dated Oct. 7, 1998 for International Publication No. WO 98/46384, published Oct. 22, 1998, 2 pages.

* cited by examiner

Primary Examiner—William Neuder
(74) Attorney, Agent, or Firm—Christie, Parker & Hale, LLP

(57) ABSTRACT

A cutting element and bit incorporating the cutting element is provided, as well as a method for forming the same. The cutting element includes an ultra hard material layer including chromium and carbon and exhibiting increased abrasion resistance without sacrificing toughness. The method for manufacturing the cutting element includes providing a layer of ultra hard material particles and chromium carbide over the substrate, and then sintering to form the cutting element.

23 Claims, 8 Drawing Sheets

Figure 3. The effect of Chromium Carbide addition on the Drop Tower Impact Test performance of drill cutting elements.

POLYCRYSTALLINE DIAMOND WITH IMPROVED ABRASION RESISTANCE

FIELD OF THE INVENTION

The present invention is related most generally to cutting elements, and a method for forming the same. More particularly, the invention is directed to a cutting element having an ultra hard polycrystalline cutting layer formed using chromium carbide.

BACKGROUND OF THE INVENTION

Cutting elements such as shear cutters for rock bits, for example, typically have a body (or substrate), which has a contact face. An ultra hard layer is bonded to the contact face of the body by a sintering process to form a cutting layer sometimes referred to as a "cutting table". The body is generally made from tungsten carbide-cobalt (sometimes referred to simply as "tungsten carbide" or "carbide"), while the ultra-hard layer is a polycrystalline ultra hard material layer, such as polycrystalline diamond ("PCD") or polycrystalline cubic boron nitride ("PCBN"). There is typically a matrix of binder material within the polycrystalline material.

Common problems that plague cutting elements having an ultra-hard material layer such as PCD or PCBN bonded to the carbide substrate, are chipping, spalling, partial fracturing, cracking or exfoliation of the cutting table. These problems result in the early failure of the ultra-hard layer and thus, in a shorter operating life for the cutting element. Typically, these problems may be the result of peak (high magnitude) stresses generated on the ultra-hard layer at the region in which the layer makes contact with an external surface, such as when the cutting layer makes contact with earthen formations during drilling. For example, generally, cutting elements are mounted onto a drag bit body at a negative rake angle. Consequently, the region of the cutting element that makes contact with an earthen formation includes a portion of the ultra-hard material layer upper surface circumferential edge. This portion of the layer is subjected to the highest impact loads.

The ultra hard material layer is generally formed of a plurality of particles compacted and sintered together. It is desirable to improve the abrasion resistance of the ultra hard material layer. Increasing the abrasion resistance of PCD materials for example, is desirable as it allows the user to cut, drill or machine a greater amount of the workpiece without wear of the cutting element. Historically, an increase in abrasion resistance has been achieved by reducing the grain size of the PCD. Toughness is sacrificed, however, as finer-grained PCD materials are less robust and more prone to chipping than coarser grades. Accordingly, much of the research into shear cutter type cutting elements has focused on making a more durable, abrasion-resistant ultra hard material layer, as well as making a better interface between the ultra hard material layer and the substrate.

It is also important that the substrate of the cutting element be durable. One common substrate material is cemented tungsten carbide. Cemented tungsten carbide generally refers to tungsten carbide ("WC") particles dispersed in a binder metal matrix, such as iron, nickel, or cobalt, often referred to as a "WC/Co" system. Tungsten carbide in a cobalt matrix is the most common form of cemented tungsten carbide, which is further classified by grades based on the grain size of WC and the cobalt content.

Another common problem that plagues cutting elements having an ultra hard material layer bonded to a carbide substrate is the formation of extremely large, undesirable carbide grains along the interface formed between the carbide substrate and the ultra hard material layer. This is particularly true of tungsten carbide grains when the favored substrate of WC/Co is used. If not controlled, tungsten carbide grains having grain sizes in the tens and hundreds of microns, may form at the interface between the tungsten carbide substrate and the ultra hard material layer. The presence of such WC particles may cause stress fractures and the early delamination of the ultra hard material layer from the substrate. It is therefore desirable to suppress the formation and incidence of WC grains at the interface.

Accordingly, there exists a need for improving various characteristics of the ultra hard material layer, such as abrasion resistance, without compromising other characteristics of the ultra hard material layer. Correspondingly, there exists a need for a manufacturing process for forming cutting elements and the like, which include such improved characteristics.

SUMMARY OF THE INVENTION

The present invention is directed to a cutting element and to a method of making the same. In one embodiment, the cutting element includes a substrate having an end surface and an ultra hard cutting layer over the end surface. The ultra hard cutting layer is formed of a polycrystalline material and includes chromium and carbon. In one embodiment, the substrate may be formed of a composition of tungsten carbide and a substrate binder material, and the ultra hard cutting layer formed of polycrystalline diamond or polycrystalline cubic boron nitride. The ultra hard layer may further include a matrix of binder material therein.

In another embodiment of the invention, a method for manufacturing a cutting element is provided. The method includes providing a substrate and providing a layer of material including ultra hard particles and chromium carbide, over the substrate. The substrate and layer of material are processed at a sufficiently high temperature and at a sufficiently high pressure to convert the layer of material to a polycrystalline material and to bond the polycrystalline material to the substrate. The polycrystalline material may be polycrystalline diamond or polycrystalline cubic boron nitride. In another exemplary embodiment, the present invention provides a method for manufacturing a cutting element comprising providing substrate material, providing a layer of material consisting of ultra hard particles or a pre-formed sheet of ultra hard particles, and processing the layer and substrate material. The layer and substrate material are processed at a sufficiently high temperature and at a sufficiently high pressure to solidify the substrate material and convert the layer to a polycrystalline material layer that is bonded to the solid substrate. The polycrystalline material layer forms an ultra hard cutting layer that includes chromium and carbon therein.

According to various exemplary embodiments, a transition layer may be used in the cutting element, between the substrate and ultra hard cutting layer. The present invention also provides a bit incorporating the various exemplary cutting elements.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Like numerals denote like features throughout the specification and drawings. Included are the following figures.

DETAILED DESCRIPTION OF THE INVENTION

The present invention provides an ultra hard polycrystalline layer that exhibits improved abrasion resistance without sacrificing toughness. In one illustrative embodiment, the present invention finds application in cutting elements and earth boring bits incorporating cutting elements used for removing earth. The present invention also finds application in other cutting elements and other tooling elements in which an ultra hard layer is advantageously utilized. More particularly, the present invention is directed to an ultra hard cutting layer metallurgically bonded to a substrate, the ultra hard cutting layer formed of a polycrystalline material and including chromium carbide and/or chromium and carbon. The polycrystalline material may be PCD or PCBN, for example. The present invention is also directed to a bit body incorporating the cutting elements. The present invention is further directed to a method for manufacturing a cutting element including the ultra hard cutting layer.

Figure 1:
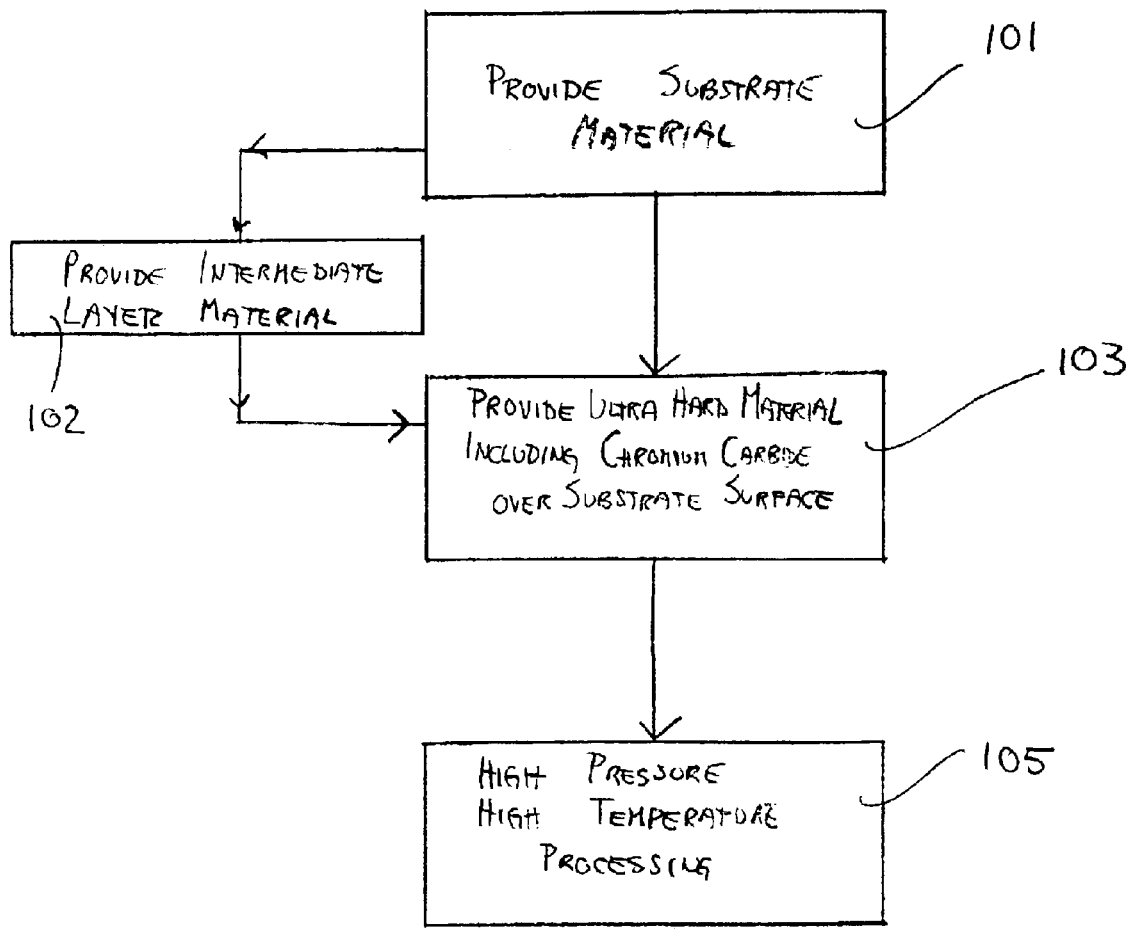
FIG. 1 is a flow chart of a method of manufacturing a cutting element according to an exemplary embodiment of the present invention.

FIG. 1 shows a flow chart that illustrates a manufacturing sequence of the present invention used to form an exemplary cutting element of the present invention. At step 101, substrate material is provided. According to one exemplary embodiment, step 101 includes providing a pre-formed solid substrate. According to this embodiment, at step 103, a layer of ultra hard particles and chromium carbide, is provided over a surface of the solid substrate. The ultra hard particles and chromium carbide may be provided in powder form or in a pre-formed sheet that incorporates a binder. In powder form, the layer may also include a binder material. High pressure, high temperature ("HPHT") processing is then used to convert the layer of ultra hard particles, chromium carbide and binder material, to a layer of ultra hard polycrystalline material, and to metallurgically join the ultra hard polycrystalline layer to the solid substrate during the same operation, at step 105. The binder material preferably forms what is often described as a binder matrix within the ultra hard polycrystalline material, and the ultra hard polycrystalline layer also includes chromium and carbon from the chromium carbide. In this embodiment, the solid substrate may take on various shapes and may be formed of various materials.

According to another exemplary embodiment of the invention, the substrate material may be provided in powder form at step 101 along with a binder material. The high pressure, high temperature processing step 105, causes the substrate material to solidify, the ultra hard particles etc., to be converted to a layer of ultra hard polycrystalline material as above, and the ultra hard polycrystalline layer to be bonded to the solid substrate.

According to either of the aforementioned exemplary embodiments, one or more optional intermediate layers may be formed by providing intermediate layer material at optional step 102, between the substrate material and the layer of ultra hard material. The intermediate, or transition, layer(s) between the substrate and the polycrystalline ultra hard cutting layer have properties intermediate to the substrate and the polycrystalline layer. According to this embodiment, one or more transition layers are formed interposed between the substrate and the ultra hard layer.

Figure 2:
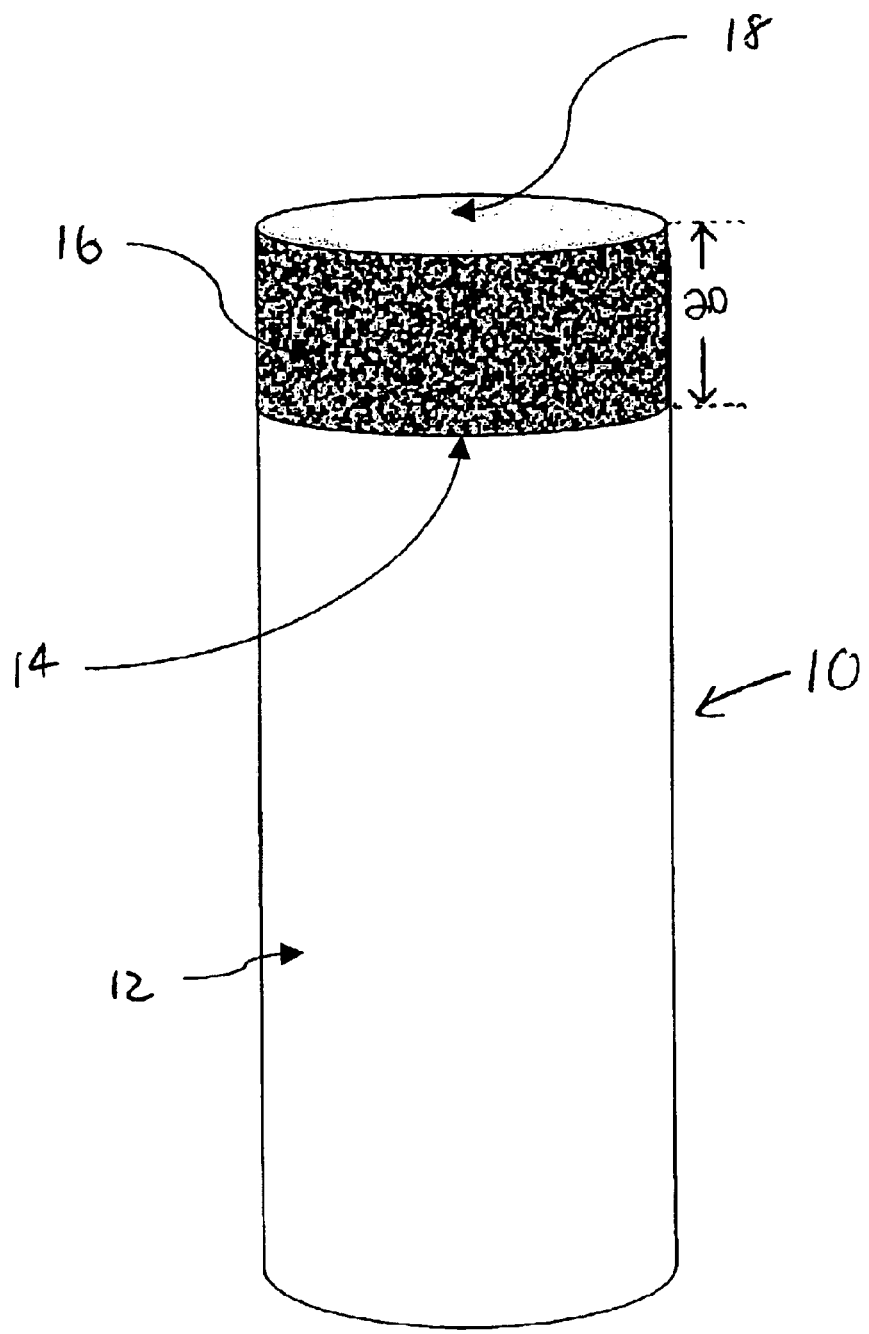
FIG. 2 is a perspective view of a cutting element according to an exemplary embodiment of the present invention.

For illustrative purposes, the present invention is described with respect to a shear cutter type of cylindrical cutting element having an ultra hard polycrystalline cutting layer formed over an end surface of the cylinder, as shown in FIG. 2. It should be understood that the cutting element configuration illustrated in FIG. 2 is intended to be exemplary only and that the cutting element may take on various other shapes and also that the ultra hard polycrystalline cutting layer may be formed on various surfaces of the variously shaped substrates, in other exemplary embodiments.

FIG. 2 shows an exemplary cutting element 10 having a generally cylindrical shape. The body of the cutting element is formed of a substrate material 12 which is a generally cylindrical member in the illustrated embodiment. In an exemplary embodiment, substrate 12 may be formed of cemented tungsten carbide. Cemented tungsten carbide generally refers to tungsten carbide particles dispersed in a substrate binder metal matrix such as iron, nickel, or cobalt, forming what is often referred to as a "WC/Co" system. The WC/Co system may be further classified by grades based on the grain size of the WC and the cobalt content. Various grades may be used. Other substrate materials may be used in other exemplary embodiments. Wear resistant materials suitable for use as the substrate may be selected from compounds of carbide and metals selected from Groups IVB, VB, VIB, and VIIB of the Periodic Table of the Elements. Examples of other such carbides include tantalum carbide and titanium carbide. Substrate binder matrix materials suitable for use in embodiments of the invention include the transition metals of Groups VI, VII, and VII of the Periodic Table of the Elements. For example, iron and nickel are good substrate binder matrix materials.

Figure 3:
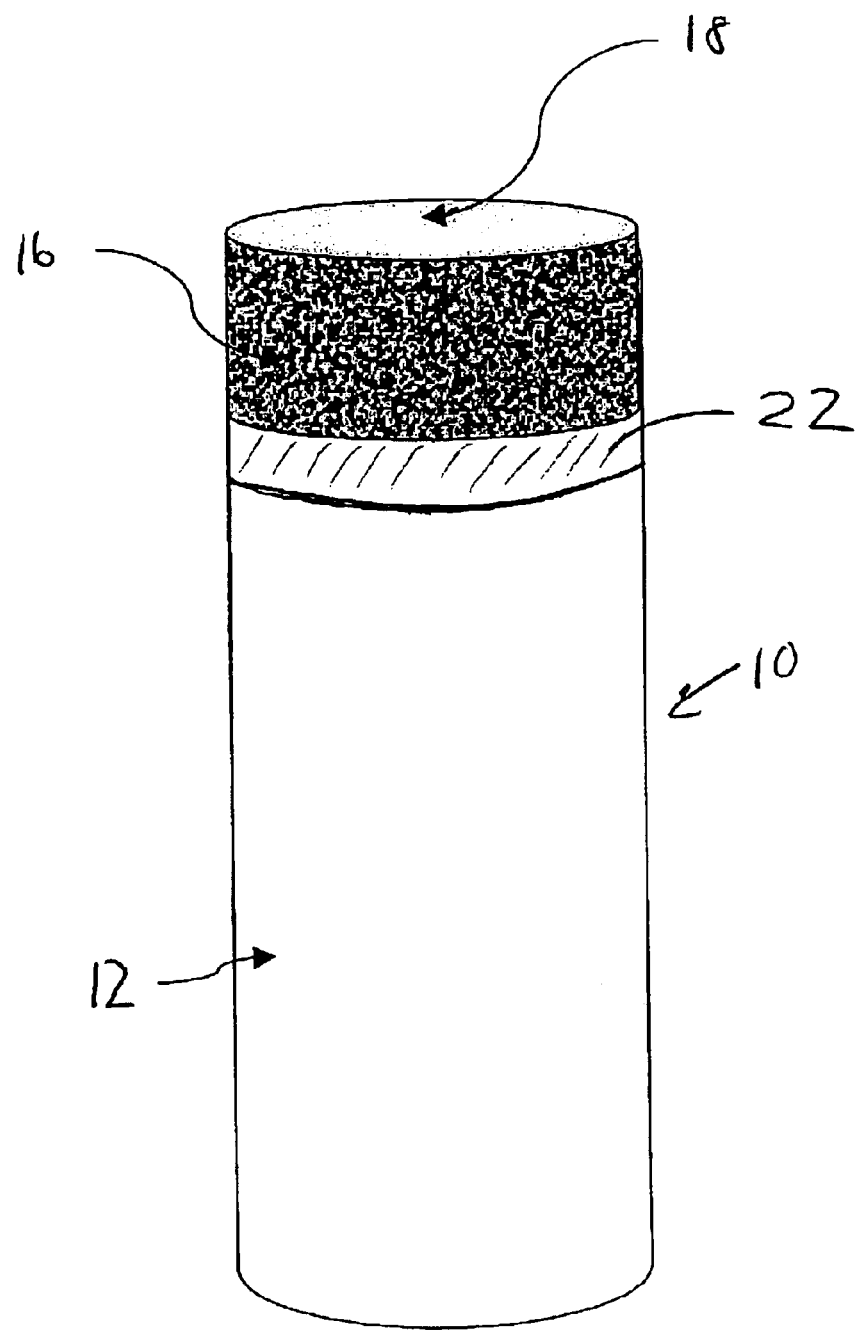
FIG. 3 is a perspective view of a cutting element according to another exemplary embodiment of the present invention.

Substrate 12 includes end surface 14 which is relatively planar in the exemplary embodiment, but may take on other shapes and morphologies in other embodiments. End surface 14 forms an interface with ultra hard layer 16 which is a polycrystalline material. Ultra hard layer 16 is also referred to as a cutting table and includes top surface 18. Ultra hard layer 16 includes thickness 20 and is metallurgically bonded to surface 14 of substrate 12 to produce an interface therebetween. According to another exemplary embodiment such as illustrated in FIG. 3, one or more transition layers such as optional transition layer 22 may be present at the interface between the ultra hard layer 16 and substrate 12. Returning to FIG. 2, a conterminous boundary is formed between ultra hard layer 16 and substrate 12 in the absence of the optional transition layer(s). In an exemplary embodiment, thickness 20 may be on the order of one or a few millimeters but other thicknesses may be used in other exemplary embodiments.

An aspect of the present invention is the method for forming the described cutting element. According to the exemplary embodiment in which a solid substrate is provided, and also according to the exemplary embodiment in which a powdered substrate material is provided, the substrate or substrate material is placed in a can in a high pressure apparatus along with a layer of ultra hard particles that will form the ultra hard cutting layer such as ultra hard layer 16 shown in FIGS. 2 and 3. The can is typically formed of niobium, but other materials may be used in other exemplary embodiments. In addition to the aforementioned substrate embodiments, a combination solid/powder substrate may be utilized where appropriate.

Chromium carbide and a binder are mixed in the layer of ultra hard particles. The ultra hard layer with chromium carbide and binder may be provided in powder form or as a pre-formed sheet that incorporates the binder. The sheet may be pre-formed using a press or by commingling under high shear compaction. Suitable binder materials include the transition metals of Groups VI, VII and VIII of the Periodic Table of Elements, such as cobalt (Co), iron (Fe), manganese (Mn) and nickel (Ni), although other suitable binder materials may be used alternatively.

The particles of ultra hard material used to form ultra hard layer 16 may be diamond powder, cubic boron nitride powder or other suitable powders of ultra hard materials that may be converted to a polycrystalline material. In addition to the ultra hard material powder and the binder material, the chromium carbide is included in this layer at a weight percentage which may range from 0.25 to 15 percent by weight of the layer. In other embodiments, as much as 50 percent by weight of chromium carbide may be used. In an exemplary embodiment, chromium carbide in the form of $Cr_3C_2$ may be used but other stoichiometries or combinations thereof may be used as the chromium carbide component.

The components are placed in the can to provide the desired shape to the ultra hard layer 16 and to shape the substrate when the substrate is provided in powder form. The layer or pre-formed sheet of ultra hard particles, chromium carbide and a binder, is placed over the substrate surface, end surface 14, and in one exemplary embodiment, the layer of material is placed directly adjacent the substrate surface. In exemplary embodiments such as illustrated in FIGS. 2 and 3, ultra hard layer 16 is a generally flat layer.

According to the exemplary embodiment in which at least one optional transition layer is used, the transition layer materials are provided between the substrate and the ultra hard layer. Components are chosen to produce a transition layer or layers that have properties, such as elastic properties, intermediate between those of the substrate and the polycrystalline layer, for example. The transition layer(s) may alleviate the effects of the CTE (coefficient of thermal expansion) mismatch between the substrate and the polycrystalline layer, for example, and also prevent regions of abnormal grain growth at the polycrystalline layer interface. In the embodiment in which the substrate is a WC/Co system and the ultra hard polycrystalline layer a PCD material, for example, the transition layer(s) prevent regions of abnormal grain growth and delamination due to the presence of large tungsten carbide grains at the interface between the polycrystalline ultra hard layer and the substrate. The intermediate/transition layer(s) also suppress the migration of binder species from the substrate into the polycrystalline layer. Such a phenomena is often referred to as infiltration.

The ultra hard layer and substrate components are brought to a sufficiently high temperature and pressure in a sintering process that converts the layer of ultra hard particles with chromium carbide and a binder, to an ultra hard polycrystalline layer, and, in the embodiment in which the substrate is provided as a powder or as a combination solid/powder, to solidify the substrate. The optional transition layer or layers are also solidified if present. The high pressure high temperature "HPHT" sintering process converts this layer of ultra hard particles and chromium carbide to an ultra hard polycrystalline layer that includes a matrix of the binder material and has incorporated chromium and carbon from the chromium carbide. In other words, the binder material fills the void spaces at the triple points within the polycrystalline material.

The chromium and carbon are present in the binder matrix phase of the ultra hard polycrystalline layer. Applicants believe the chromium and carbon to be present as one or more phases of chromium carbide. In an exemplary embodiment with cobalt as the binder material and PCD as the polycrystalline material, x-ray mapping imaging established that chromium is uniformly dispersed throughout the cobalt matrix phase in the PCD. According to each of the above embodiments, the ultra hard layer is formed directly and metallurgically bonded to the substrate surface, such as in the illustrated embodiment of FIG. 2 in which ultra hard layer 16 forms a conterminous boundary with end surface 14 of substrate 12 in the absence of any optional transition layers. If an optional transition layer or layers are present, the ultra hard layer 16 is bonded to one of the transition layers. Optional transition layer 22 is illustrated in FIG. 3 which also shows ultra hard layer 16 bonded to exemplary transition layer 22.

In an exemplary embodiment, cobalt is added as the binder material, to the powder layer used to form ultra hard layer 16, and ultra hard layer 16 is formed to include a cobalt matrix therewithin. Such an addition of cobalt prior to the HPHT process used to form ultra hard layer 16, may obviate the need to rely upon cobalt infiltration from the substrate to provide a suitable (cobalt) matrix within ultra hard layer 16.

Applicants have discovered that polycrystalline ultra hard layer 16 formed using chromium carbide additive, is characterized by an increased abrasion resistance without compromising its toughness or hardness. The hardness of a typical polycrystalline ultra hard layer, characterized by a conventional Vickers hardness measurement, may be in the vicinity of 4,000 kg/mm$^2$ or greater. The average grain size of the polycrystalline diamond or polycrystalline cubic boron nitride may lie within the range of 2–75 microns, but may vary in other exemplary embodiments. The increased abrasion resistance may be described as an increased resistance to attrition of materials of the ultra hard layer due to abrading action between the grains of the ultra hard layer and the test or working surface.

A conventional test for quantifying abrasion resistance is the granite log abrasion test ("GLT") which involves machining the surface of a rotating cylinder of granite. Barre granite, for example, is a commonly used granite for this type of test. In an exemplary test, the log is rotated at an average of 630 surface feet per minute (192 mpm) past a half inch (13 mm) diameter cutting disk. There is an average depth of cut of 0.02 in (0.5 mm) and an average removal rate of 0.023 in$^3$/second (0.377 cm$^3$/second). The cutting element being tested, has a back rake of 15° in the granite log abrasion test. One determines a wear ratio defined as volume of log removed to volume of cutting tool removed. With a standard PCD cutting tool made without chromium carbide, the wear ratio is approximately 1×10$^6$, that is, the ratio of volume of granite log removed to volume of cutting tool removed, is approximately 1,000,000:1.

Figure 4:
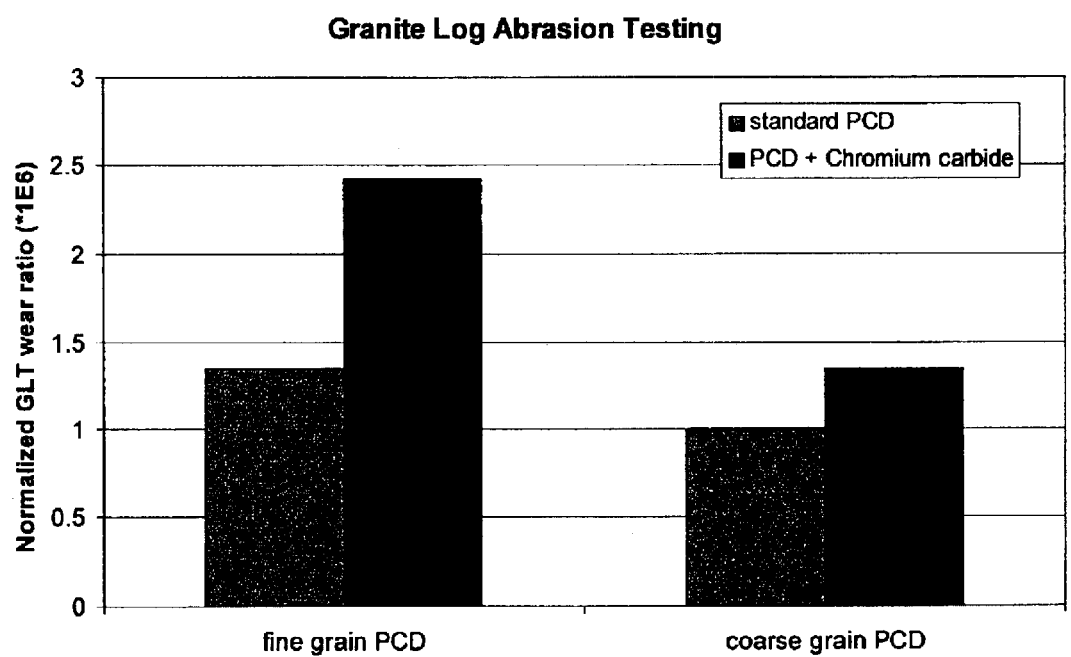
FIG. 4 is a graphical representation of normalized granite log abrasion test wear ratio score comparing conventional polycrystalline diamond to polycrystalline diamond formed according to the present invention.

FIG. 4 is a graphical representation illustrating granite log abrasion testing results for the granite log abrasion resistance test parameters described above, and using Barre granite. In FIG. 4, the effect of chromium carbide addition to a PCD layer is illustrated. In the left hand side bar graph, the effect of chromium carbide addition is shown for a fine grain (15–35 micron) PCD cutting layer and on the right side, the effect of chromium carbide addition is shown for a coarse grain, about 45 microns or greater, PCD cutting layer. The GLT wear ratio is normalized to account for multiple granite logs. It can be seen that the ultra hard polycrystalline layer formed using chromium carbide, includes an abrasion resistance which is at least 50% greater than the abrasion resistance of the standard PCD. For the fine grain PCD, it can be seen that approximately a 75–80% increase in abrasion resistance is achieved due to the addition of chromium carbide. The GLT wear ratio of the fine grain PCD sample formed using the chromium carbide additive, is in the vicinity of 2.4×10$^6$. FIG. 4 illustrates that the enhancement and performance is greater in the finer grain size material. Each of the chromium carbide cutting layer samples evaluated in FIG. 4 was prepared using a 0.5 weight percent of chromium carbide in the powder used to form the ultra hard PCD cutting layer.

Figure 5:
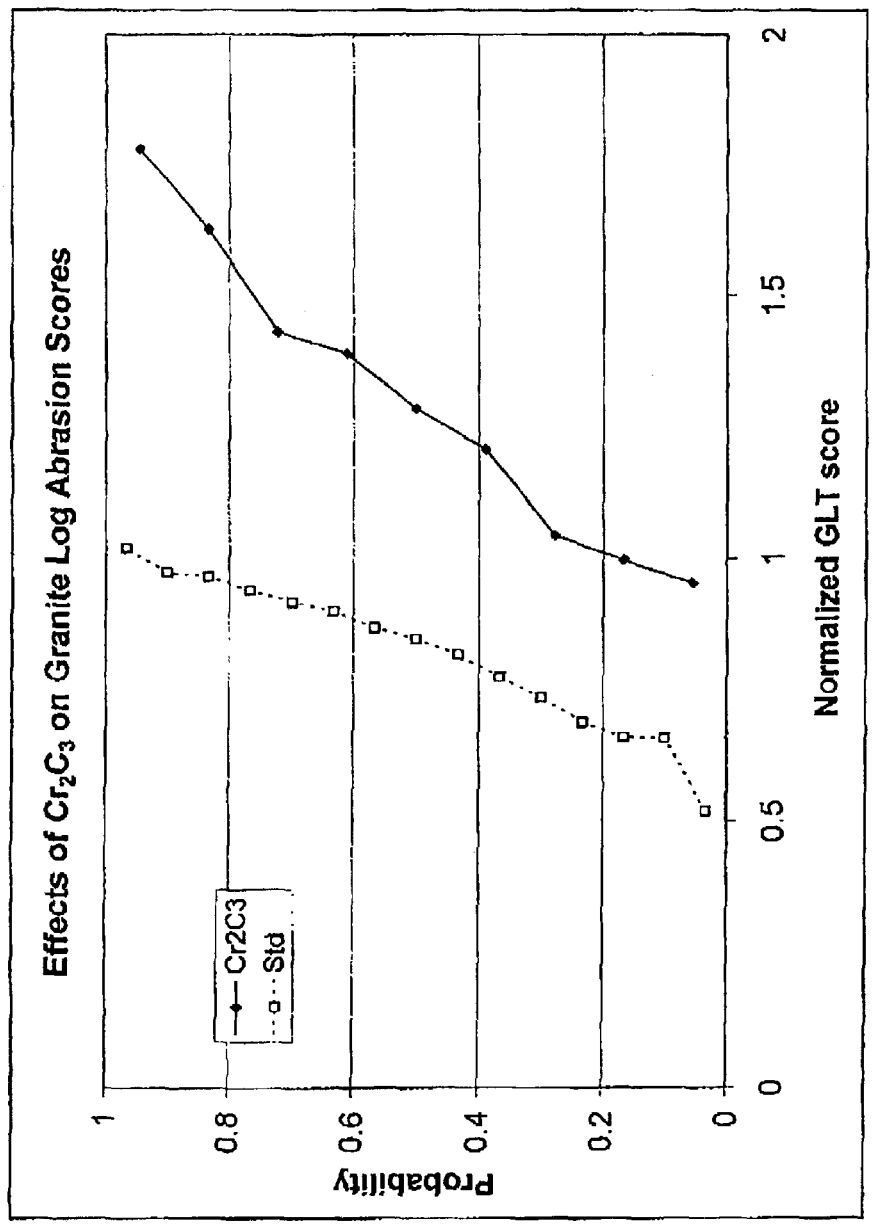
FIG. 5 is a graphical representation showing the effects of chromium carbide addition upon granite log abrasion scores for PCD.

FIG. 5 is a graphical representation showing the effects of $Cr_3C_2$ addition, on granite log abrasion scores. The sample evaluated in FIG. 5 was also a PCD sample prepared with a 0.5 weight percentage of $Cr_3C_2$ in the powder used to form the polycrystalline ultra hard cutting layer. FIG. 5 represents a Weibull plot commonly used for displaying a non-normal distribution of data samples and shows the effect of $Cr_3C_2$ addition which produces a significantly increased normalized GLT score for the $Cr_3C_2$ samples.

Figure 6:
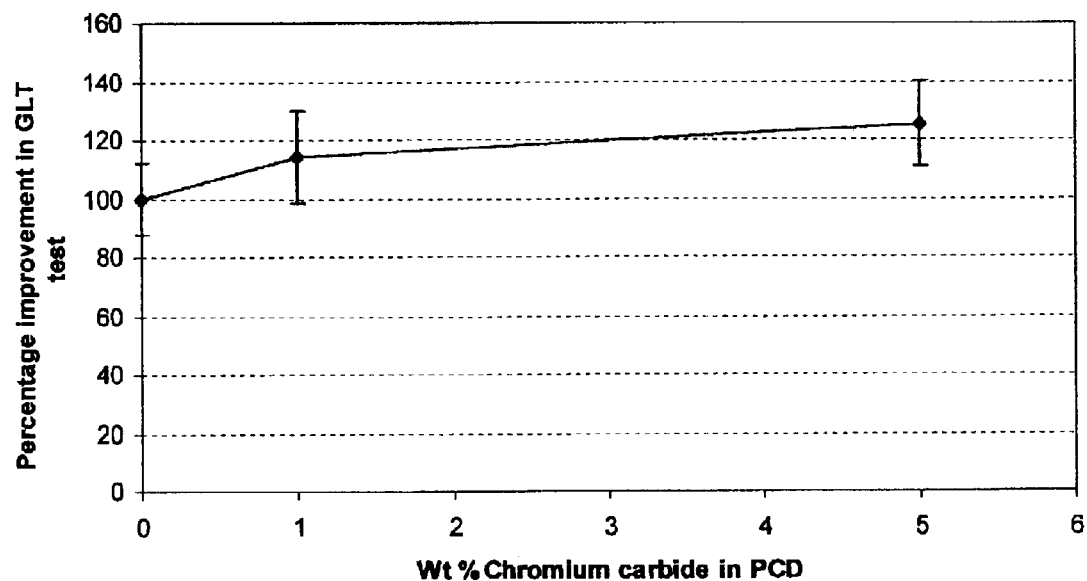
FIG. 6 is a graphical representation of granite log abrasion test scores of PCD having various percentages of chromium carbide.

FIG. 6 is a graphical representation showing the effect of varying the percentage of chromium carbide additions to a course grained PCD cutting layer as evidenced by a granite log abrasion testing. FIG. 6 shows a percentage improvement in the GTL test score and indicates that as the weight percentage of chromium carbide added to the PCD increases from 0 to 1% to 5%, the improvement in the GLT test result improves by about 17% and about 23%, respectively, compared to PCD which was formed without the chromium carbide additive. The weight percentages shown in FIG. 6 again represent the weight percentage of the chromium carbide in the powder material used to form the ultra hard cutting layer.

Figure 7:
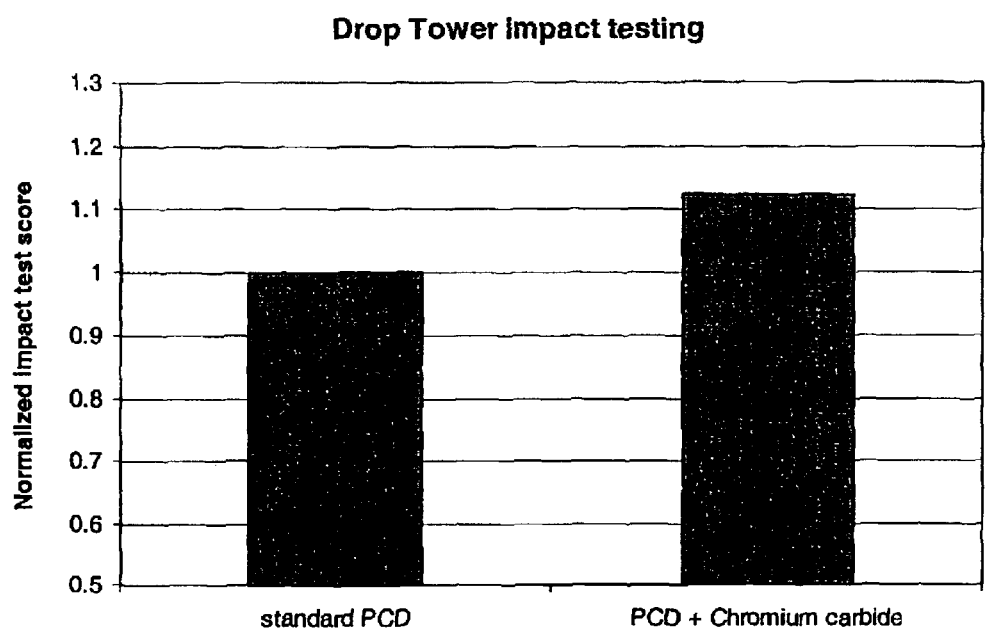
FIG. 7 is a graphical representation of drop tower impact test scores and shows the effect of adding chromium carbide to PCD.

Another advantage of the addition of chromium carbide to the ultra hard cutting layer, according to the present invention, is that the toughness of the polycrystalline layer is not compromised. In fact, FIG. 7 shows that toughness is enhanced. FIG. 7 is a graphical representation showing the effect of 1.37 wt % chromium carbide addition on drop tower impact testing, and includes testing on two PCD samples. Drop tower impact testing is one indirect way of evaluating material toughness and is a conventional test that measures impact energy and is well known in the art. The results are normalized for comparative purposes. A higher normalized impact test score indicates a tougher material. As can be seen from FIG. 7, a toughness improvement of approximately 13% occurs for the sample with chromium carbide. The bar graph on the left of FIG. 7 shows a standard PCD sample which was formed without the addition of chromium carbide. The bar graph on the right represents ultra hard PCD layers formed by the addition of 1.37 wt % chromium carbide to the layer of ultra hard particles and represents multiple samples.

Yet another advantage of the present invention is the suppression of abnormally large grain growth at the interface between the polycrystalline, ultra hard cutting layer and the substrate. For the exemplary embodiment in which the substrate is a WC/Co substrate and the ultra hard cutting layer is PCD, applicants have discovered that the addition of chromium carbide to the PCD suppresses the formation of WC grains at the interface. More particularly, the chromium carbide addition suppresses the incidence of large, WC grains which may have grain sizes on the order of tens to hundreds of microns, at the interface. Such regions of abnormal tungsten carbide grain growth are often called eruptions. These regions of abnormal grain growth extend into the ultra hard layer and create inhomogeneous regions in the PCD. Depressions or pits may then be visible in the PCD upon removal of the carbide substrate. Moreover, when large WC grains are formed at the interface between the substrate and a thin PCD layer, for example, a PCD layer having a thickness between 0.16 mm and 0.3 mm, metal spots may form on the surface of the PCD as the abnormally large WC grains essentially extend through the PCD layer. The present invention therefore also alleviates this problem by suppressing the incidence of larger WC grains at the interface. The produced interface is characterized as being substantially free of WC grains having a grain size larger than the average grain size of the substrate. In an exemplary embodiment, the size of WC grains in a substrate may range from 1 to 10 microns, but in other exemplary embodiments, the WC grain sizes may range from 0.1 to 20 microns or larger. The reduction or elimination of WC grains from the interface reduces stress and minimizes or eliminates fracturing at the interface which could cause the early delamination of the ultra hard layer from the substrate.

Applicants believe that the volume percentage of chromium carbide, or chromium and carbon, within ultra hard layer 16, may range from 0.25 volume percent to 50 volume percent after sintering. The preferred volume percentage is determined by the cutting layer characteristics sought, and the upper limit of the amount of chromium carbide added is determined by the point at which a loss of continuity of polycrystalline grains is produced. Such loss of continuity is undesirable.

Figure 8:
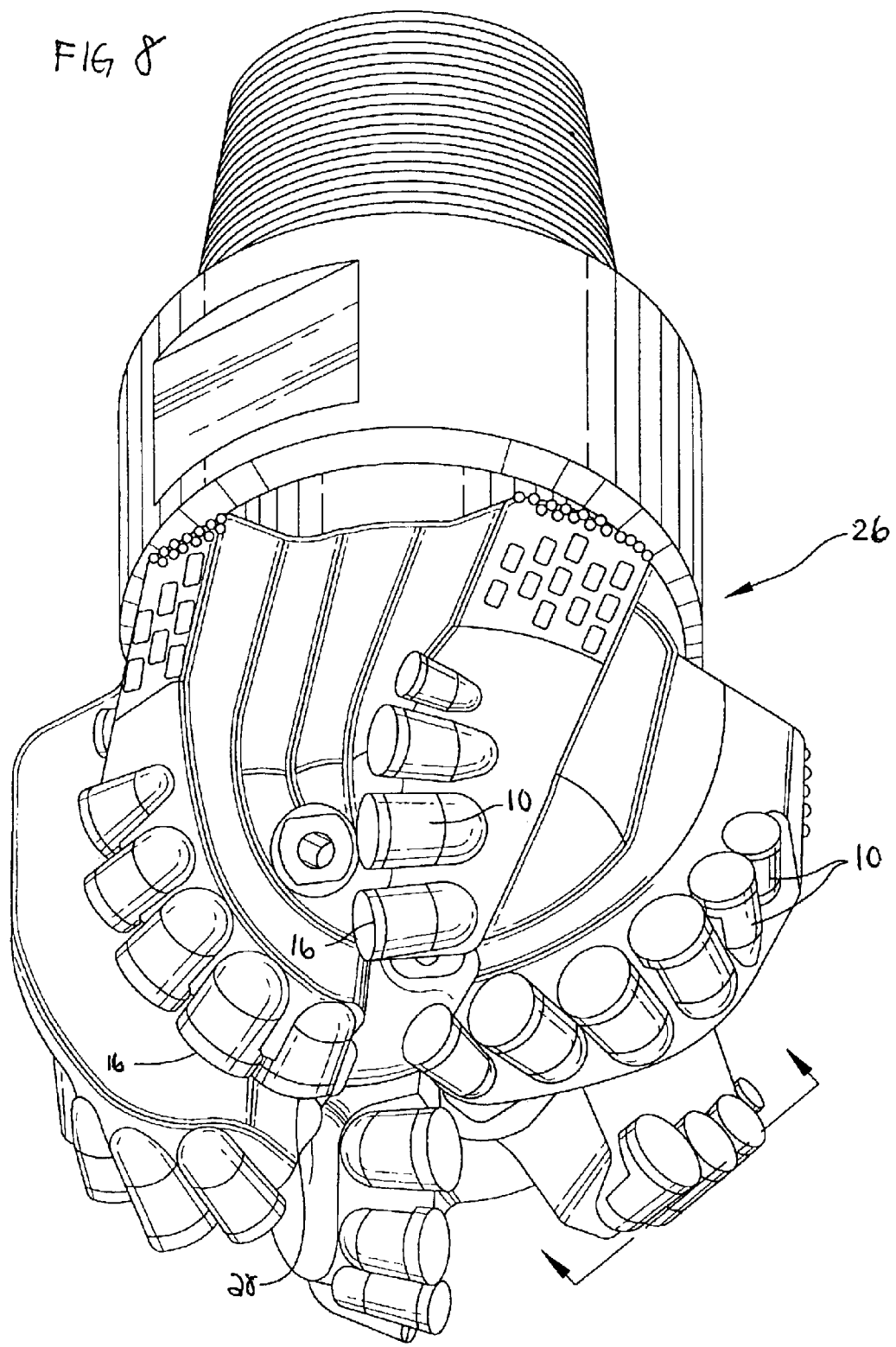
FIG. 8 is a perspective view of a bit body outfitted with exemplary embodiment cutting elements of the present invention.

In one illustrative embodiment, the cutting elements 10 of the present invention are mounted in exemplary drag bit 26 as shown in FIG. 8, and contact the earthen formation along edge 28, during drilling. This arrangement is intended to be exemplary only and cutting elements 10 may be used in various other arrangements in other embodiments.

The preceding merely illustrates the principles of the invention. It will thus be appreciated that those skilled in the art will be able to devise various arrangements which, although not explicitly described or shown herein, embody the principles of the invention and are included within its scope and spirit. Furthermore, all examples and conditional language recited herein are principally intended expressly to be only for pedagogical purposes and to aid in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and the functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

What is claimed is:

1. A cutting element comprising:
   a substrate having an end surface, and
   an ultra hard layer over said end surface, said ultra hard layer comprising a polycrystalline material, chromium and carbon, wherein said polycrystalline material comprises polycrystalline diamond, and wherein said substrate is formed of WC/Co and said ultra hard layer is directly bound to said end surface and forms an interface therewith, said interface characterized by an absence of WC grains having a grain size greater than an average grain size of said substrate.

2. The cutting element as in claim 1, in which said substrate is composed of a carbide and a substrate binder material formed of a transition metal.

3. The cutting element as in claim 1, wherein said ultra hard layer further comprises cobalt incorporated within void spaces of said polycrystalline diamond.

4. The cutting element as in claim 1, wherein said ultra hard layer is conterminous with said end surface.

5. The cutting element as in claim 1, wherein said chromium causes an increase of at least 50% in the abrasion resistance of the ultra hard layer.

6. The cutting element as in claim 1 wherein the ultra hard layer has a granite log abrasion test wear ratio of at least $2\times10^6$.

7. The cutting element as recited in claim 6, wherein the ultra hard layer is a polycrystalline diamond layer.

8. The cutting layer as recited in claim 6 wherein the ultra hard layer is formed by sintering.

9. The cutting layer as recited in claim 1 wherein the ultra hard layer is a polycrystalline diamond layer.

10. The cutting layer as recited in claim 9 wherein the ultra hard layer is formed by sintering.

11. The cutting layer as recited in claim 1 wherein the ultra hard layer is formed by sintering.

12. The cutting element as in claim 1 wherein the ultra hard layer is characterized by a granite log abrasion test wear ratio of at least $2.0\times10^6$.

13. A drill bit comprising a cutting element, said cutting element comprising a substrate having an end surface, and
   an ultra hard layer over said end surface, said ultra hard layer comprising a polycrystalline material, chromium and carbon, wherein said substrate is formed of WC/Co and said ultra hard layer is formed of polycrystalline diamond and is directly bonded to said end surface thereby forming an interface therewith, said interface characterized by an absence of WC grains having a grain size greater than an average grain size of said substrate.

14. A cutting element comprising
   a substrate having an end surface, and
   an ultra hard layer over said end surface, said ultra hard layer comprising a polycrystalline material, chromium and carbon, wherein said ultra hard material layer has a granite log abrasion test wear ratio of at least $2\times10^6$.

15. The cutting element as in claim 14, in which said substrate is formed of WC/Co and said ultra hard layer is formed of polycrystalline diamond and is directly bound to said end surface thereby forming an interface therewith, said interface characterized by an absence of WC grains having a grain size greater than an average grain size of said polycrystalline diamond.

16. The cutting element as in claim 14, wherein said polycrystalline material comprises polycrystalline diamond.

17. The cutting element as in claim 14, wherein said polycrystalline material comprises polycrystalline cubic boron nitride.

18. The cutting element as in claim 14, in which said substrate is composed of a carbide and a substrate binder material formed of a transition metal.

19. The cutting element as in claim 14, wherein said polycrystalline material comprises polycrystalline diamond and said ultra hard layer further comprises cobalt incorporated within void spaces of said polycrystalline diamond.

20. The cutting element as in claim 14, wherein said ultra hard layer is conterminous with said end surface.

21. The cutting element as in claim 14, further comprising a transition layer interposed between said ultra hard layer and said end surface.

22. The cutting element as in claim 14, wherein said chromium causes an increase of at least 50% in the abrasion resistance of the ultra hard layer.

23. The cutting element as in claim 14, said cutting element being mounted on a drill bit.

* * * * *